Aug. 19, 1952 — C. D. WEST — 2,607,093
VARIABLE SIZE MOLDING FASTENER CLIP
Filed Feb. 21, 1950

INVENTOR.
C. D. WEST
BY
A. Yates Dowell
ATTORNEY

Patented Aug. 19, 1952

2,607,093

UNITED STATES PATENT OFFICE 2,607,093

VARIABLE SIZE MOLDING FASTENER CLIP

Charles D. West, Orlando, Fla.

Application February 21, 1950, Serial No. 145,333

8 Claims. (Cl. 24—73)

This invention relates to ornamentation and more particularly to a novel fastener means in the form of a clip for detachably securing a trim molding to a supporting structure such as the body of a vehicle or any other desired object.

Heretofore numerous devices have been developed for this purpose, but many of these were specifically adapted for use only with certain types of molding which required the maintenance of a relatively large inventory of parts and these prior art devices possessed further disadvantages, such as insufficient mechanical strength and difficulty of assembly, both with the molding and in the application to the supporting structure and were relatively costly to fabricate.

It is, accordingly, an object of this invention to provide a fastener in the form of a clip which may be conveniently attached to all conventional types of molding regardless of the dimensions thereof and which provides a secure, mechanically strong structure which will effectively maintain the molding in place in the presence of the relatively large vibratory forces encountered in such installations.

It is a further object of the invention to provide a fastener in the form of a clip which may be economically fabricated from sheet metal stampings and which may conveniently be assembled with conventional trim moldings by a simple manually executed clamping operation.

Figure 1:
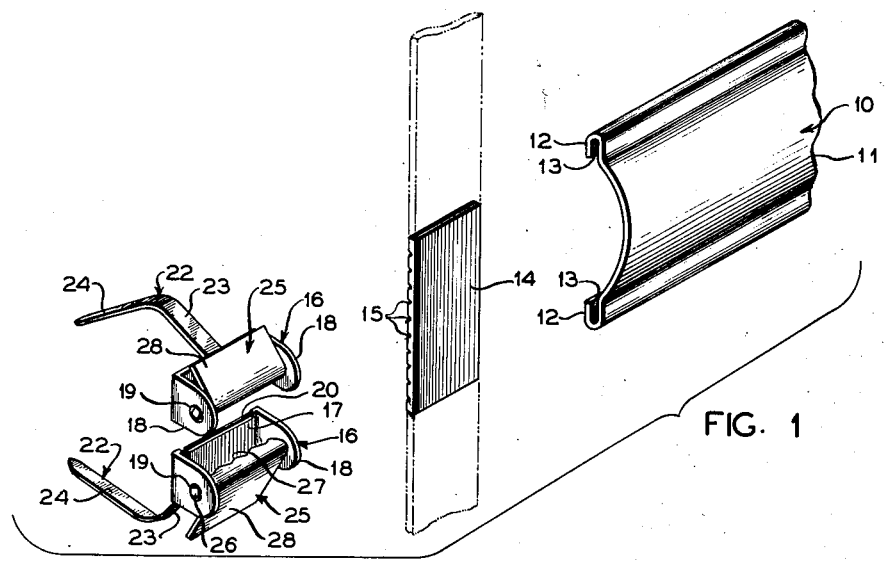
Figure 4:
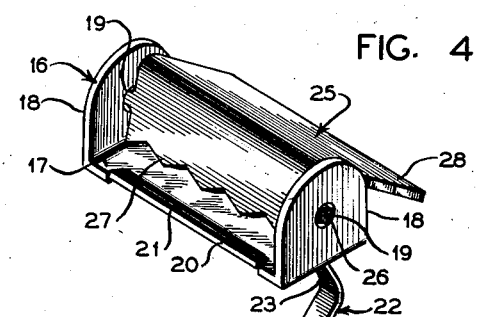
Figure 2:
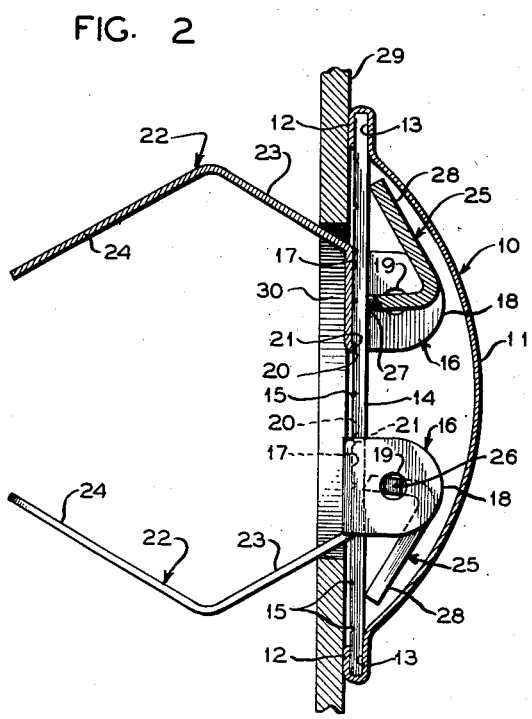
Figure 3:
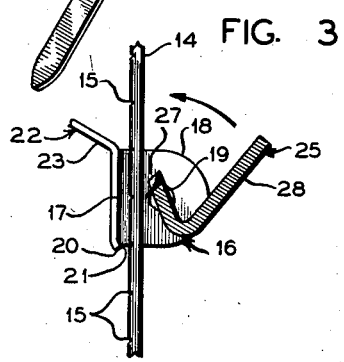

Further objects and advantages of the invention will be apparent from the following description taken in conjunction with the accompanying drawings, wherein:

Fig. 1 is an exploded perspective view showing the fastener clip of this invention and an adapter strip for cooperation therewith to assemble the clip with the molding and a portion of a conventional trim molding;

Fig. 2, a partial sectional view showing the fastener assembled with a molding and with the molding and clip installed on a supporting structure, one of the clip members being shown in section and the other clip member being shown in elevation;

Fig. 3, a fragmentary sectional view showing the manner of assembling the adapter strip with the fastener clip; and Fig. 4, a perspective view of the fastener clip constructed in accordance with this invention.

With continued reference to the drawing, there is shown in Fig. 1 a trim molding 10 which it is desired to secure to a supporting structure, such as the body of a vehicle or other object. The molding 10 comprises a generally channel-shaped member having a web portion 11 and opposed inwardly turned marginal flanges 12 forming longitudinally extending grooves or channels 13.

In order to properly secure the molding 10 to a supporting structure there is provided an adapter strip 14 which may be fabricated in any convenient stock-length, strip 14 preferably comprising a relatively narrow, thin sheet metal member having a plurality of transverse substantially parallel score lines or serrations 15 in one face thereof, these serrations performing two very significant functions; the first permitting breaking of the strip along any selected serration in order to obtain an adapter strip of the desired length for the particular molding being used. This feature eliminates the necessity for stocking a large number of different sized adapter strips, or especially designed fastener clips since it is thus rendered possible to merely break off an adapter strip of a desired length from a stock strip of any convenient length. The second function performed by the serration 15 will be described in detail in connection with the description of the fastener clip immediately following.

The fastener clip of this invention is shown generally at 16 in Fig. 1 and it will be noted that two identical fastener clips are utilized in assembling the molding 10 with a supporting structure. It is, therefore, considered necessary to describe in detail only one of the fastener clips.

The fastener clip 16, as best shown in Figs. 2, 3 and 4, comprises a base member 17 having upstanding ears 18 at each end thereof. Each of the ears 18 is provided with a centrally located aperture 19, the purpose of which will be presently described. The base member 17 is provided over a portion of the length of one edge thereof with an upstruck portion 20 which provides a relatively sharp inwardly directed edge 21 which serves to engage one of the serrations 15 in the adapter strip 14 when assembled therewith, as will be more fully described hereinafter. The opposite side of the base member 17 is provided with an elongated leg 22 extending at substantially right angles thereto, this leg, as best shown in Fig. 2, comprising an inner portion 23 extending outwardly at a slight angle away from the plane of the base member 17 and an outer portion 24 extending inwardly at an angle to the inner portion 23, the leg 22 being relatively resilient in order to permit bending thereof and return to its original position upon being assembled with a supporting structure.

A clamping member 25 in the form of an angular cam is provided with pivot portions 26 rotatably received in apertures 19 in the ears 18. The inner edge 27 of the clamping member 25 is serrated to provide a series of relatively sharp projections, the purpose of which will presently be described. The clamping member 25 is likewise provided with an angularly extending finger engaging portion 28 which is conveniently utilized to actuate the same.

In using the fastener clip of this invention, it is first necessary to provide an adapter strip 14 of the correct length to be slidably but snugly received in the longitudinal channels or grooves 13 of the trim molding 10 after which the adapter strip 14 is assembled with two of the fastener clips 16, as shown in Fig. 3. As will be seen from an inspection of this figure, the clamping member 25 is rotated in such a manner that the serrated edge 27 is sufficiently spaced from the base member 17 to permit passage of the adapter strip 14 between the edge 27 and the base member 17, with the serrations 15 facing the base portion 17. The fastener clip 16 should be located at the proper position on the adapter strip 14 with the inwardly extending sharp edge 21 engaging in one of the serrations 15.

After properly positioning the clip member 16, the clamping member 25 is rotated in the direction of the arrow shown in Fig. 3 to bring the sharp serrated edge 27 into engagement with the surface of the strip 14 to force the same into tight engagement with the base member 17 and with the inwardly extending edge 21 engaging in one of the serrations 15. It will be noted from an inspection of Fig. 2 that upon complete clamping movement of the clamping member 25 the serrated edge 27 in engagement with the adapter strip 14 is slightly beyond dead center, which will cause the clamping member to be locked in position and with the serrated edge 27 slightly indenting or penetrating the surface of the adapter strip 14. This operation results in securely fixing the fastener clip 16 on the adapter strip 14 and the same will not be dislodged therefrom even by the application of extremely large vibratory forces.

As shown in Fig. 2, a pair of fastener clips 16 are assembled on the adapter strip 14 which is thereafter located within the longitudinal channels or grooves 13 of the trim molding 10 and associated fastener clips 16 are applied to the supporting structure 29 by inserting the legs 22 of the fastener clips 16 through an aperture 30 in the supporting structure. It will be obvious that as the legs 22 pass through the aperture 30, they will bend inwardly and thereafter outwardly to securely clamp the molding 10 in place on the supporting structure 29. Obviously, a plurality of the adapter strips 14 and the fastener clips 16 will be located at appropriate places along the molding 10 to coincide with the number of apertures 30 and location thereof in the supporting structure 29.

It will be seen that by the above described invention, there has been provided a relatively simple, easily assembled fastening means for securing conventional trim moldings in place on a supporting structure, the fastening means being universally applicable to all conventional moldings, thus eliminating the necessity for maintaining a large stock of especially designed fastening means.

It will be obvious to those skilled in the art that various changes may be made in the invention without departing from the spirit and scope thereof, and therefore the invention is not limited by that which is shown in the drawings and described in the specification but only as indicated in the appended claims.

What is claimed is:

1. A fastener for attaching trim mold to a supporting structure comprising an adapter strip having spaced transverse serrations in one surface thereof, said serrations providing lines of weakness whereby said strip may be broken to provide the desired length, a pair of clip members clamped to said adapter strip at any desired location, each clip member comprising a base member having an upstruck ear at each end thereof, an aperture in each ear, a clamping member having a sharp serrated edge and a finger engaging portion pivotally mounted in said apertures, said base member having an inwardly extending relatively sharp strip engaging edge and a resilient free leg extending outwardly from said base member, said adapter strip being securely clamped in position by the engagement of said sharp edge with one of said serrations and the engagement of said serrated edge with said strip, said serrated edge when in clamping position being beyond dead center whereby said serrated edge is retained in clamping engagement with said strip.

2. A fastener for attaching trim molding to a supporting structure comprising an adapter strip having spaced transverse serrations in one surface thereof, a pair of clip members clamped to said adapter strip at any desired location, each clip member comprising a base member having an upstanding ear at each end thereof, a clamping member having a sharp serrated edge and a finger engaging portion pivotally mounted on said ears, said base member having an inwardly extending relatively sharp strip engaging edge and a resilient free leg extending outwardly from said base member, said adapter strip being securely clamped in position by the engagement of said sharp edge with one of said serrations and the engagement of said serrated edge with said strip, said serrated edge when in clamping position being beyond dead center whereby said serrated edge is retained in clamping engagement with said strip.

3. A fastener for attaching trim molding to a supporting structure comprising an adapter strip having spaced transverse serrations in one surface thereof, a pair of clip members clamped to said adapter strip at any desired location, each clip member comprising a base member, a clamping member having a clamping edge and a finger engaging portion pivotally mounted on said base member, said base member having an inwardly extending relatively sharp strip engaging edge and a resilient free leg extending outwardly from said base member, said adapter strip being securely clamped in position by the engagement of said sharp edge with one of said serrations and the engagement of said clamping edge with said strip, said clamping edge when in clamping position being beyond dead center whereby said clamping edge is retained in clamping engagement with said strip.

4. A fastener for attaching trim molding to a supporting structure comprising an adapter strip having spaced transverse serrations in one surface thereof, a pair of clip members clamped to said adapter strip at any desired location, each clip member comprising a base member, a clamping member having a clamping edge and a finger engaging portion pivotally mounted on said base member, said base member having an inwardly extending relatively sharp strip engaging edge and a resilient free leg extending outwardly from said base member, said adapter strip being securely clamped in position by the engagement of said sharp edge with one of said serrations and the engagement of said clamping edge with said strip.

5. A fastener for attaching trim molding to a supporting structure comprising an adapter strip, a pair of clip members clamped to said adapter strip at any desired location, each clip member comprising a base member, a clamping member having a clamping edge and a finger engaging portion pivotally mounted on said base member, said base member having an inwardly extending relatively sharp strip engaging edge and a resilient free leg extending outwardly from said base member, said adapter strip being securely clamped in position by the engagement of said sharp edge with one surface of said strip and the engagement of said clamping edge with the opposite surface of said strip.

6. A fastener for attaching trim molding to a supporting structure comprising an adapter strip having spaced transverse serrations in one surface thereof, a pair of clip members clamped to said adapter strip at any desired location, each clip member comprising a base member, a clamping member pivotally mounted on said base member, means on said base member engaging at least one of said serrations, a resilient free leg extending outwardly from said base member, said adapter strip being securely clamped in position by the engagement of said means with said serrations and the engagement of said clamping member with said strip.

7. A fastener as defined in claim 6 in which said clamping member comprises a cam having a relatively sharp penetrating edge for engaging a surface of said strip, said cam when in clamping engagement being positioned beyond dead center whereby said edge is retained in clamping engagement with said strip.

8. A fastener for attaching trim mold having opposed longitudinal channels to a supporting structure provided with a plurality of spaced apertures, said fastener comprising an adapter strip slidably receivable within said channels and provided with spaced serrations in one surface thereof, said serrations providing lines of weakness whereby said strip may be broken to provide the desired length, a pair of clip members clamped to said adapter strip at any desired location, each clip member comprising a base portion having an upstruck ear at each end thereof, each of said ears being provided with an aperture, a clamping member having a sharp serrated edge and an opposed finger engaging portion pivotally mounted in said apertures, one edge of said base portion having an inwardly extending relatively sharp adapter strip engaging edge, the other edge of said base portion having a resilient free leg extending outwardly therefrom, said adapter strip being securely clamped in position by the engagement of the sharp edge of said base portion with one of said serrations and the engagement of said serrated edge with the adapter strip, said serrated edge when in clamping position being beyond dead center, the opposed resilient legs of each pair of clip members being receivable within one of said apertures in said supporting structure to lock said clamping members upon said adapter strip.

CHARLES D. WEST.

REFERENCES CITED

The following references are of record in the file of this patent:

UNITED STATES PATENTS

| Number | Name | Date |
|---|---|---|
| 1,500,907 | Tucker | July 8, 1924 |
| 2,105,706 | Stamy | Jan. 18, 1938 |
| 2,207,374 | Fernberg | July 9, 1940 |
| 2,557,773 | Steinman | June 19, 1951 |

FOREIGN PATENTS

| Number | Country | Date |
|---|---|---|
| 525,202 | Great Britain | Aug. 23, 1940 |